US009311412B2

(12) United States Patent
Boullery

(10) Patent No.: US 9,311,412 B2
(45) Date of Patent: Apr. 12, 2016

(54) AUTOMATICALLY NOTIFYING A COMPUTER USER OF INTERNET CONTENT

(75) Inventor: Didier Boullery, Sartrouville (FR)

(73) Assignee: International Business Machines Corporation, Armonk, NY (US)

(*) Notice: Subject to any disclaimer, the term of this patent is extended or adjusted under 35 U.S.C. 154(b) by 464 days.

(21) Appl. No.: 13/549,836

(22) Filed: Jul. 16, 2012

(65) Prior Publication Data

US 2014/0019845 A1    Jan. 16, 2014

(51) Int. Cl.
*G06F 17/00* (2006.01)
*G06F 17/30* (2006.01)

(52) U.S. Cl.
CPC ................. *G06F 17/30867* (2013.01)

(58) Field of Classification Search
CPC ............ G06F 17/30867; G06F 17/30386; G06F 17/30861; G06F 17/211; G06F 17/3089; G06F 17/2288; G06F 17/241
USPC .......................... 715/234, 229, 230
See application file for complete search history.

(56) References Cited

U.S. PATENT DOCUMENTS

| | | | |
|---|---|---|---|
| 5,873,100 A * | 2/1999 | Adams et al. | |
| 6,032,182 A | 2/2000 | Mullen-Schultz | |
| 6,119,135 A | 9/2000 | Helfman | |
| 6,175,830 B1 * | 1/2001 | Maynard | |
| 6,834,306 B1 * | 12/2004 | Tsimelzon | 709/228 |
| 7,143,118 B2 * | 11/2006 | Eichstaedt et al. | |
| 7,165,220 B1 | 1/2007 | Bates et al. | |
| 7,210,094 B2 | 4/2007 | Dovin et al. | |
| 7,499,948 B2 | 3/2009 | Smith et al. | |
| 7,594,013 B2 | 9/2009 | Wang et al. | |
| 7,707,505 B1 * | 4/2010 | Ohrt et al. | 715/738 |
| 7,788,212 B2 * | 8/2010 | Beckmann et al. | 707/622 |
| 7,840,684 B2 | 11/2010 | Goel et al. | |
| 8,291,065 B2 * | 10/2012 | Goodman et al. | 709/224 |
| 8,489,599 B2 * | 7/2013 | Bellotti | 707/736 |
| 8,719,176 B1 * | 5/2014 | Harrison, Jr. | 705/319 |
| 8,756,313 B2 * | 6/2014 | Zhou et al. | 709/224 |
| 8,924,869 B2 * | 12/2014 | Fellman | 715/762 |
| 2002/0049961 A1 | 4/2002 | Fang et al. | |
| 2004/0039795 A1 | 2/2004 | Percival | |
| 2005/0165903 A1 | 7/2005 | Doan et al. | |
| 2007/0022135 A1 * | 1/2007 | Malik | 707/102 |
| 2007/0038931 A1 * | 2/2007 | Allaire et al. | 715/526 |

(Continued)

FOREIGN PATENT DOCUMENTS

JP    2002073455 A  *  3/2002

OTHER PUBLICATIONS

Kishimoto JP2002073455A, Publication date: Mar. 12, 2002, Sony Corp, Machine Translation provided by USPTO STIC Translation on Sep. 11, 2014, pp. 1-14.*

(Continued)

*Primary Examiner* — Laurie Ries
(74) *Attorney, Agent, or Firm* — Maeve McCarthy

(57) ABSTRACT

In a method for automatically notifying a computer user of Internet content, a computer reads a user-created rule on the computer. A current version of a web page named in the user created rule is requested from another computer. The current version of the web page is searched for specific content, which is defined in the user-created rule. A determination is made that the specific content meets a target condition, and the computer user is notified that the target condition has been met.

19 Claims, 5 Drawing Sheets

(56) References Cited

U.S. PATENT DOCUMENTS

| | | | |
|---|---|---|---|
| 2007/0038934 A1* | 2/2007 | Fellman | 715/700 |
| 2007/0073833 A1 | 3/2007 | Roy et al. | |
| 2008/0021858 A1 | 1/2008 | Dolph | |
| 2008/0072164 A1 | 3/2008 | Park | |
| 2009/0094137 A1 | 4/2009 | Toppenberg et al. | |
| 2009/0119254 A1* | 5/2009 | Cross et al. | 707/3 |
| 2009/0287659 A1* | 11/2009 | Bennett | 707/3 |
| 2010/0036730 A1* | 2/2010 | Chan | 705/14.51 |
| 2010/0114914 A1 | 5/2010 | Gerges et al. | |
| 2010/0179949 A1 | 7/2010 | Safar | |
| 2011/0302161 A1* | 12/2011 | Walker et al. | 707/723 |
| 2012/0066380 A1* | 3/2012 | Gao et al. | 709/224 |
| 2012/0072816 A1* | 3/2012 | Rakshit | 715/205 |
| 2012/0173994 A1* | 7/2012 | Ho et al. | 715/752 |
| 2012/0302258 A1* | 11/2012 | Pai et al. | 455/456.2 |
| 2013/0018702 A1* | 1/2013 | Smith et al. | 705/7.36 |
| 2013/0073473 A1* | 3/2013 | Heath | 705/319 |
| 2013/0104026 A1* | 4/2013 | Reynar et al. | 715/234 |
| 2013/0283150 A1* | 10/2013 | Chen et al. | 715/234 |

OTHER PUBLICATIONS

Kishimoto JP2002073455A, Publication date: Mar. 12, 2002, Translated abstract, pp. 1-2.*

IBM, "Changing Browser Home Page", Jun. 28, 2007, ip.com [online], [retrieved on Apr. 30, 2012]. Retrieved from: Prior Art Database, ip.com No. IPCOM000154376D.

IBM, "Self-adaptive Multi Home-Page Using Interest Indicators", May 11, 2005, ip.com [online], [retrieved on Apr. 30, 2012]. Retrieved from: Prior Art Database, ip.com No. IPCOM000124869D.

IBM TDB, "Method to Allow Multiple "Home" Pages in a Web Browser", Jun. 21, 2003, ip.com [online], [retrieved on Apr. 30, 2012]. Retrieved from: Prior Art Database, ip.com No. IPCOM000016048D.

* cited by examiner

AUTOMATICALLY NOTIFYING A COMPUTER USER OF INTERNET CONTENT

FIELD OF THE INVENTION

The present invention relates generally to web browsing, and more particularly to automatically notifying a computer user of Internet content.

BACKGROUND

Web browsers are applications that allow users to access and interact with information on the Internet. A web browser typically receives information in Hypertext Markup Language (HTML). HTML is organized into pages of information, with various elements making up components on each page. When a user accesses a web page using a web browser, a server computer system locates and retrieves the HTML elements associated with the web page. An HTML element can have specified attributes and content, including other elements or text. An example of an HTML element is a "title" element, which represents the title of the web page. Accessed web page elements and components are displayed on a client computing device of the user.

To access a web page, a user must either enter a Uniform Resource Locator (URL) into a web browser or click on a hyperlink in a currently opened web page or document, both of which allow a web browser to retrieve the desired web page for viewing by the user. Often, for web pages that are frequently visited by a user, the user will typically be most interested in the portions of a web page that have changed since a prior visit. A user is made aware of these changes either by accessing and viewing the web page in the web browser, or receiving a notification, generally via email or RSS feed, that the web page has been updated. When the user is notified by email of the updated web page, the user may then access the web page, either by entering the URL or by clicking a hyperlink, to view the changes.

SUMMARY

Embodiments of the present invention provide a system, method, and program product. The method comprises a computer reading a user-created rule on the computer and the computer requesting, from another computer, a current version of a web page that is named in the user-created rule. The method further comprises the computer searching the current version of the web page for specific content defined in the user-created rule and determining if the specific content meets a target condition defined in the user-created rule. In response to the computer determining the target condition is met, the computer notifies a user of the computer that the target condition has been met.

DETAILED DESCRIPTION

Figure 1:
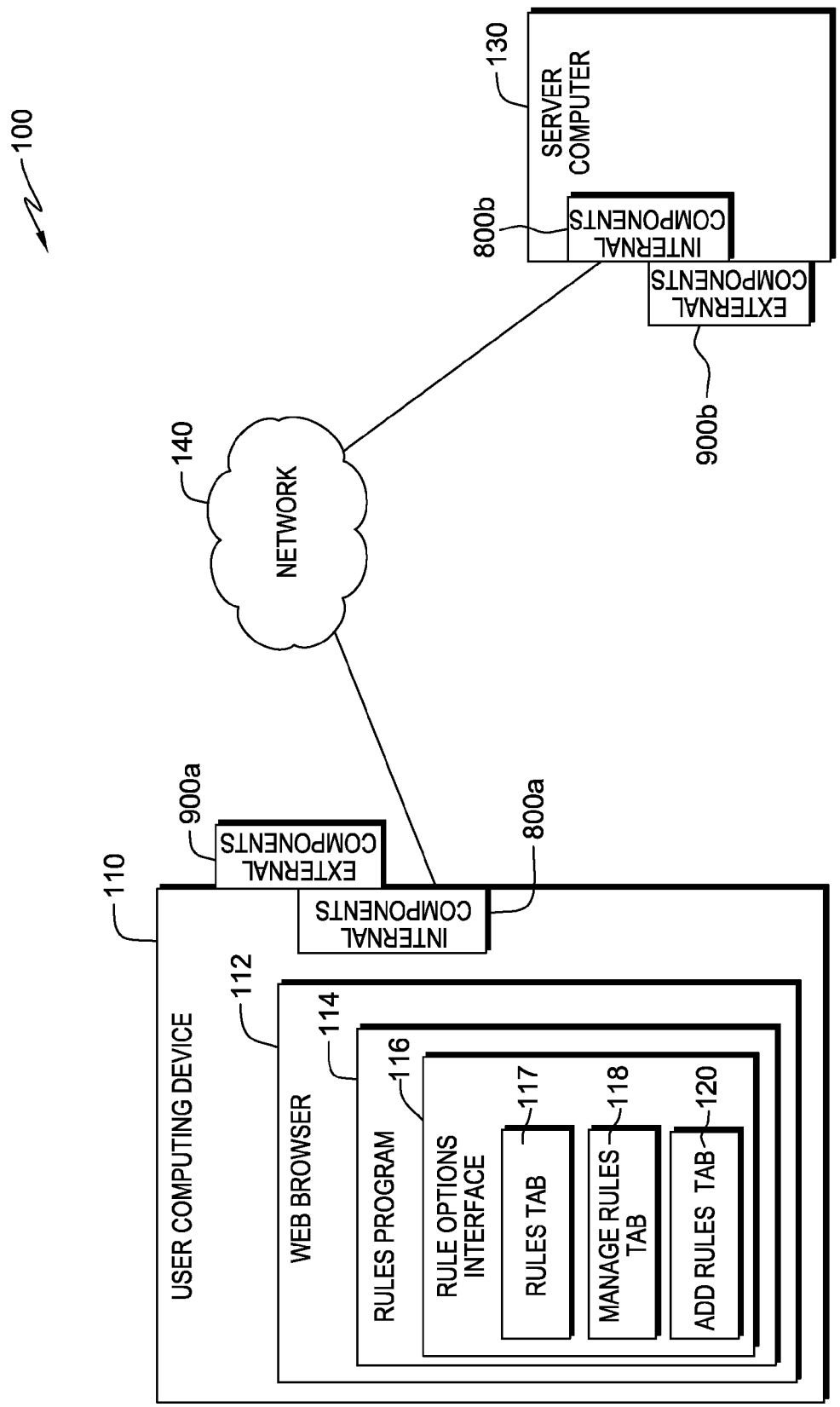
FIG. 1 is a functional block diagram of a distributed data processing environment, including a user computing device and a server computer, in accordance with an embodiment of the present invention.

FIG. 1 is a functional block diagram of a distributed data processing environment, including a user computing device and a server computer, in accordance with an embodiment of the present invention. Distributed data processing environment 100 includes user computing device 110 and server computer 130, all interconnected over network 140.

Network 140 can be, for example, a local area network (LAN), a wide area network (WAN) such as the Internet, or a combination of the two, and can include wired, wireless, or fiber optic connections. In general, network 140 can be any combination of connections and protocols that will support communications between user computing device 110 and server computer 130.

In various embodiments of the present invention, user computing device 110 can be a laptop computer, netbook computer, personal computer (PC), desktop computer, personal digital assistant (PDA), tablet computer, smart phone, or any programmable electronic device capable of communicating with server computer 130 via network 140. User computing device 110 can include internal components 800*a* and external components 900*a*, as depicted and described in further detail with respect to FIG. 6. User computing device 110 includes web browser 112.

Web browser 112 is a software application that can offer a user of user computing device 110 web browsing capabilities by communicating with server computer 130 via network 140. Web browser 112 is capable of running rules program 114, which can be downloaded to user computing device 110 via network 140 or integrated into other software products that can be installed on the user computing device. Rules program 114 may be a browser add-on, browser extension, or other program which can increase the functionality and enhance the features of web browser 112. Rules program 114 identifies and reads user-created rules which can be managed, created and edited using rule options interface 116, with associated rules tab 117, manage rules tab 118, and add rules tab 120. A rule may contain specific content, one or more web pages to search for the specific content, and one or more target conditions corresponding to the specific content. Rules program 114 operates to search web pages, which the user may provide in a rule, for specific content. For example, the specific content may include a temperature, a keyword in a news feed, or a stock price. Rules program 114 may determine whether the specific content meets a target condition the user sets, for example, a certain temperature value or a threshold stock price. In response to determining that the specific content meets a target condition, rules program 114 performs any of a number of operations that notify a user that the target condition is met, such as opening a web page or sending an email. In various embodiments, rules program 114 may run on a schedule a user may set.

Figure 6:
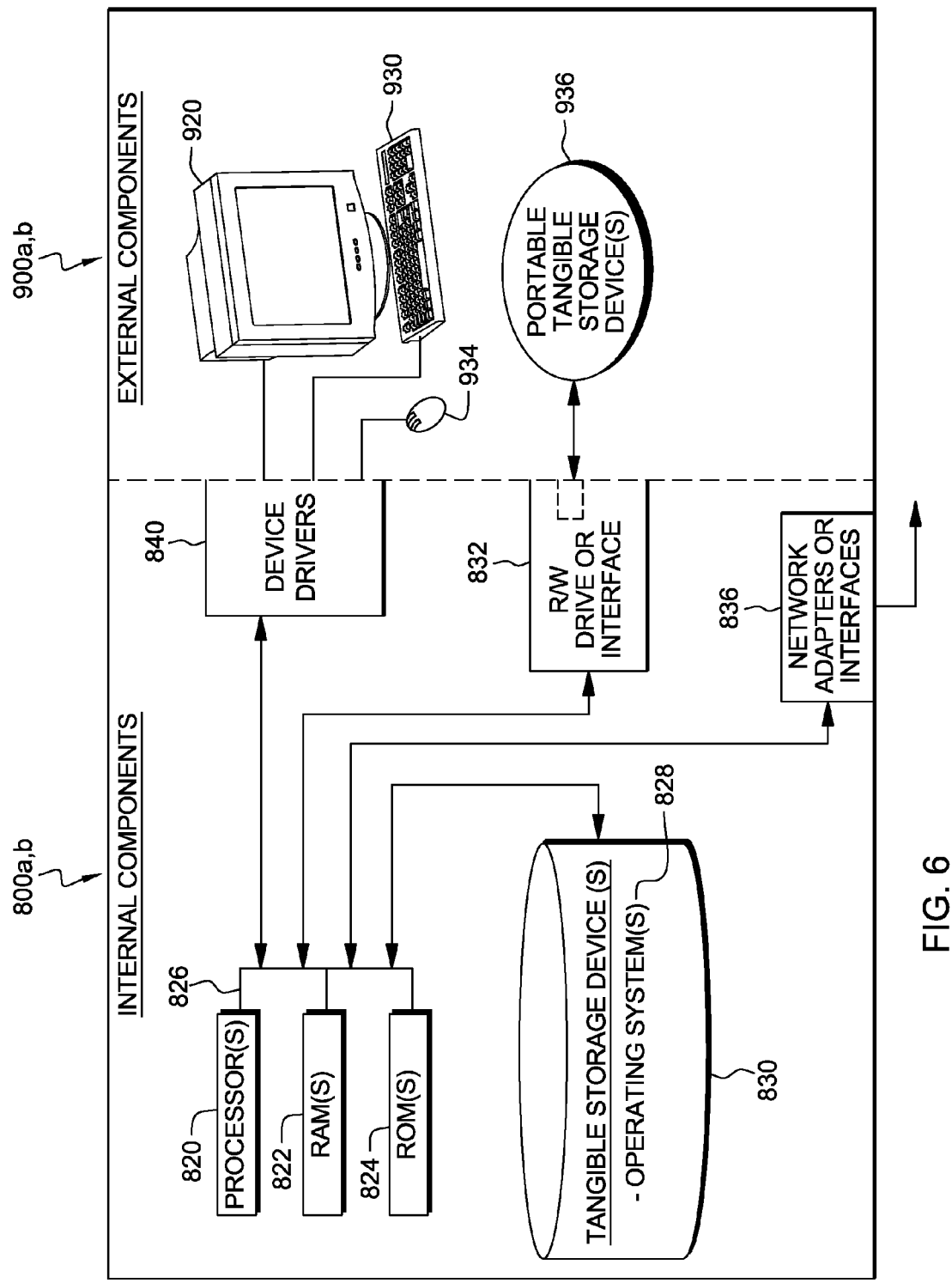
FIG. 6 shows a block diagram of internal and external components of a data processing system, such as the user computing device or server computer of FIG. 1, in accordance with an embodiment of the present invention.

Server computer 130 can contain internal components 800*b* and external components 900*b*, as depicted and described in further detail with respect to FIG. 6. In various embodiments of the present invention, server computer 130 can be any type of server computer, including a web server computer or network server computer, a laptop computer, netbook computer, personal computer (PC), desktop computer, personal digital assistant (PDA), tablet computer, smart phone, or any programmable electronic device capable of communicating with user computing device 110 via network 140.

Figure 2:
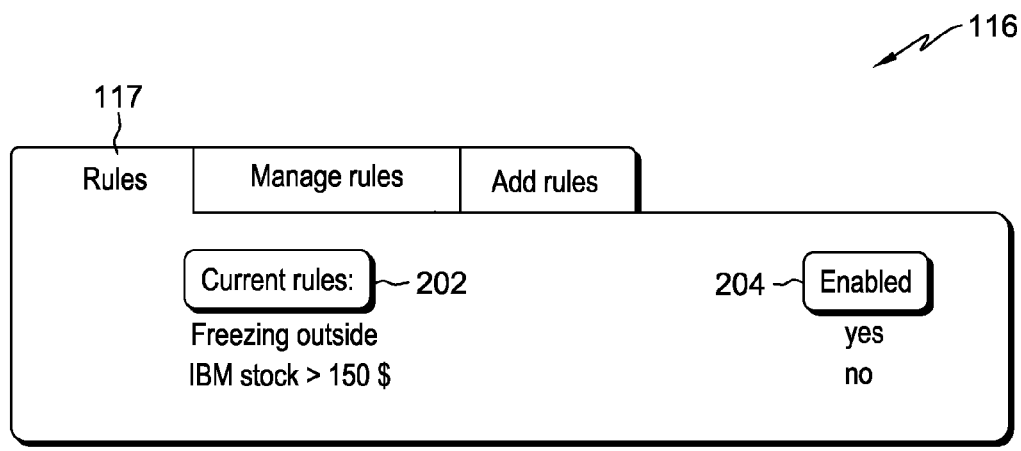
FIG. 2 is an exemplary depiction of a rule options interface for managing, adding and editing user-created rules, in accordance with an embodiment of the present invention.

FIG. 2 is an exemplary depiction of a rule options interface for aiding a user in managing, adding and editing user-created rules, in accordance with an embodiment of the present invention. Rule options interface 116 may include rules tab 117, manage rules tab 118 and add rules tab 120. In an embodiment, included on rule options interface 116 is rules tab 117, displaying generally current rules 202, which lists created rules, and enabled field 204, which displays to the user the status of a current rule as enabled or as disabled. A user may select manage rules tab 118 to edit, remove or enable/disable added rules. A user may select add rules tab 120 to add and create a rule.

Figure 3:
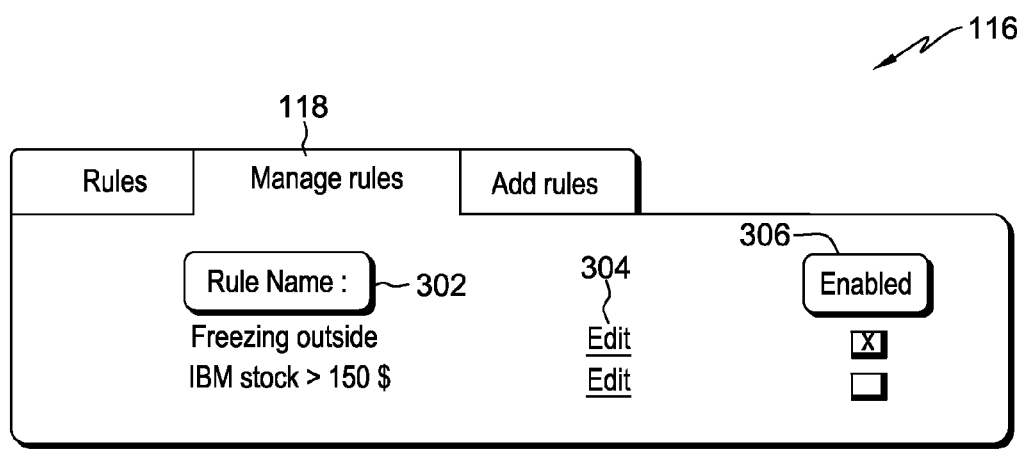
FIG. 3 is an exemplary depiction of a manage rules tab for managing user-created rules, in accordance with an embodiment of the present invention.

FIG. 3 is an exemplary depiction of manage rules tab 118 of FIG. 2, in accordance with an embodiment of the present invention. Manage rules tab 118, which may be included within rule options interface 116, may allow a user to manage previously created rules. Previously created rules may be shown under rule name column 302. Under manage rules tab 118 edit button 304 may be found which, when selected, takes a user to add rules tab 120. At add rules tab 120, the user can, in addition to creating a new rule, edit the fields of a previously created rule and remove, or cancel, a previously created rule. Manage rules tab 118 may also contain enabled option 306. Enabled option 306 may allow a user to select and enable a previously created rule for use by rules program 114, or to de-select and disable a previously created rule.

Figure 4:
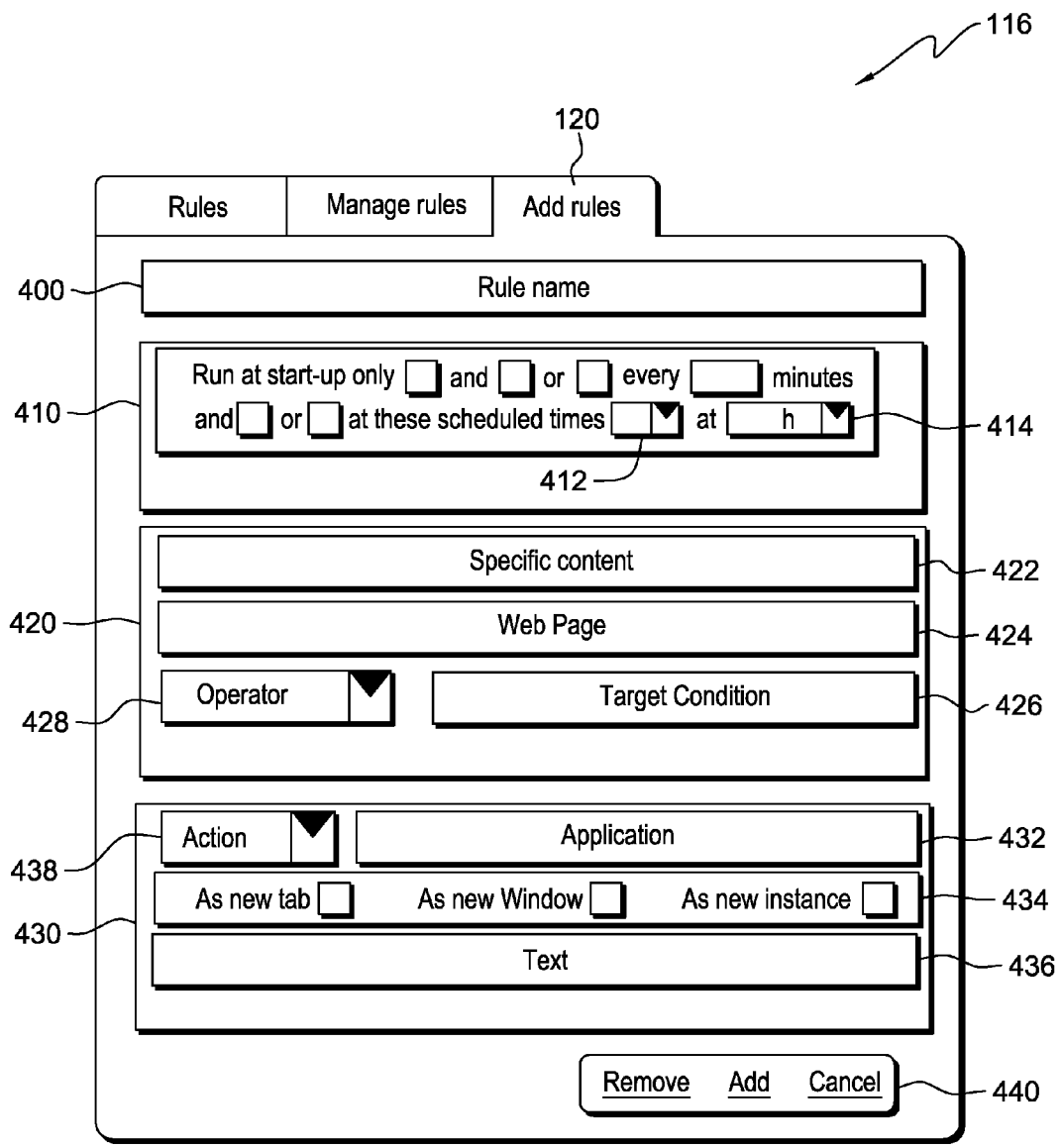
FIG. 4 is an exemplary depiction of an add rules tab for adding and editing user-created rules, in accordance with an embodiment of the present invention.

FIG. 4 is an exemplary depiction of add rules tab 120 of FIG. 2, in accordance with an embodiment of the present invention. Add rules tab 120, which also may be included within rule options interface 116, may allow a user to set for each rule, for example, a schedule 410, a variable 420, which includes a target condition 426, and an operation 430 to be performed in response to meeting the target condition for a rule. Rules program 114 can execute each rule based on the information included within add rules tab 120.

Rule name 400 can be any combination of words, phrases, characters or numbers to identify the added rule to the user, for example, "IBM stock >150$" may signify the added rule involves the share price of IBM stock. Schedule 410 can allow a user to set a timing schedule for the rule to run either at start up only, every 30 minutes, for example, or on certain days or at certain times of the day. In one embodiment, schedule fields 412 and 414 include drop down lists with selectable options, which may include specific days of the week and a time of day, respectively.

Variable 420 is a field which allows a user to define the specific content to be monitored and the target condition the user desires for the specific content. Specific content 422 can be any combination of words, phrases, characters, numbers or a field name found on web page 424. The user may name web page 424, which involves providing either a URL or IP address that web browser 112 may use to request the web page information from server computer 130. Rules program 114 can search web page 424 for specific content 422. For example, a user may set web page 424 as a local weather website and set specific content 422 as a certain temperature.

Add rules tab 120 may also contain target condition 426 and operator 428. A user can edit these fields to set the desired target condition for specific content 422, which can be, for example, a threshold value for a stock price or a target temperature. In one embodiment, operator 428 can be a drop down list which can include equal to, greater or less than, containing, or various other operators which help to identify target condition 426. For example, operator 428 can be "less than" and target condition 426 can be "32 degrees". Rules program 114 can search the named web page 424, e.g., a local weather website, and attempt to locate specific content 422, e.g., a temperature, on the web page. Once located, rules program 114 can determine whether specific content 422 meets target condition 426, e.g., the temperature less than 32 degrees.

In response to a finding that target condition 426 is met, rules program 114 performs actions the user has entered into the fields in operation 430. Action 438 may include various actions such as open, close, run, display, send mail to, or send SMS to, for example. Application 432 can contain either a web page to open, a desktop application to start or an email address to send an electronic message to, for example. In various embodiments, a user may designate another party to receive a notification that target condition 426 has been met, for example, by selecting "send mail to" in action 438 and providing another's email address in application 432. Selection fields 434 may allow the user to select the manner in which application 432 is performed. For example, a new tab can be opened in web browser 112, a new browser window or an application window can be opened, or a new instance of an ongoing application can be initiated. Text 436 may allow the user to include text for a message the user intends to send when target condition 426 is met. The text can be included in an email, an SMS, or passed to an application, for example, for addition to a spreadsheet field.

Add rules tab 120 additionally can contain option field 440, which may allow a user to add, remove or to cancel a rule. When the 'Add' option in option field 440 is selected, the user-created rule can be stored and added to the list of current rules 202 in FIG. 2. The user can then manage a created rule from rule options interface 116. Option field 440 can allow the user to remove a rule when directed to add rules tab 120 from manage rules tab 118, or to decide to cancel a rule while editing and before adding the rule.

Figure 5:
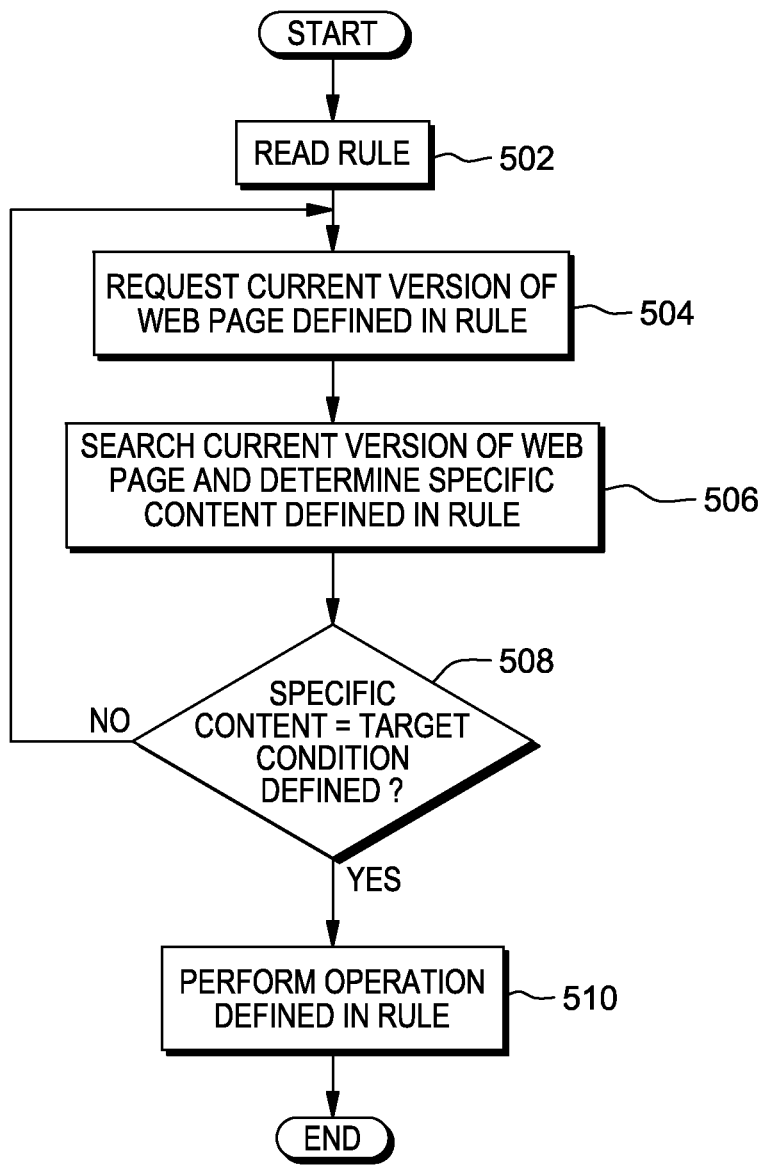
FIG. 5 is a flowchart illustrating the steps of a rules program for identifying and performing the operations defined in user-created rules, in accordance with an embodiment of the present invention.

FIG. 5 is a flowchart illustrating the steps of rules program 114, for performing user-defined operations in response to finding target conditions for specific content on a web page, in accordance with an embodiment of the present invention.

Rules program 114 can run on rules which a user creates, enables and can later edit using rule options interface 116. Rules program 114 can operate to retrieve web pages the user names in a rule, and, without displaying the web page, examines the web page content to determine whether a user-defined target condition is met. If the user-defined condition is met, rules program 114 can perform an operation to notify the user that the condition has been met.

Rules program 114 reads a rule a user has created using rule options interface 116 of FIG. 2 (step 502). The rule may include information regarding specific content 422, web page 424 containing the specific content, target condition 426 and operation 430 to be performed by rules program 114 if the target condition of the specific content is met.

Rules program 114 requests, from server computer 130, the current version of web page 424 containing specific content 422, as defined in the rule (step 504). The web page can be any website or database accessible through a URL that a user names in add rules tab 120. Rules program 114 does not, at least at this point, display web page 424 to the user. At step 506, rules program 114 searches the current version of web page 424 and determines either the location of or absence of specific content 422 on the web page. Specific content 422, for example, may be a temperature on a weather website, a share price of a stock on a news page, a word appearing in a news feed, or a post on a social network site.

Rules program 114 determines whether located specific content 422 meets target condition 426 defined in the user-created rule (decision block 508). For example, whether a temperature on a weather website has fallen below a certain value. If specific content 422 does meet the defined target condition 426 (decision block 508, yes branch), then rules program 114 performs operation 430 (step 510). Operation 430 can be any computer-implementable action the user defines that may notify the user of the condition being met, for example, opening and displaying a web page, sending a SMS message, or opening a desktop application. If specific content 422 does not meet target condition 426 (decision block 508, no branch), then rules program 114 returns to request the current version of web page 424 (step 504). In one embodiment, rules program 114 may continue to monitor web page 424 based on the schedule defined by the user in add rules tab 120.

FIG. 6 shows a block diagram of the internal and external components 800 a,b and 900 a,b of a data processing system, such as user computing device 110 or server computer 130, in accordance with an illustrative embodiment of the present invention. It should be appreciated that FIG. 6 provides only an illustration of one implementation and does not imply any limitations with regard to the environments in which different embodiments may be implemented. Many modifications to the depicted environments can be made based on design and implementation requirements.

The data processing system 800 a,b, 900 a,b is representative of any electronic device capable of executing machine-readable program instructions. Data processing system 800 a,b, 900 a,b may be representative of a smart phone, a computer system, PDA, tablet computer, or other electronic devices. Examples of computing systems, environments, and/or configurations that can be represented by data processing system 800 a,b, 900 a,b include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User computing device 110 and server computer 130 include respective sets of internal components 800 a,b and external components 900 a,b, illustrated in FIG. 6. Each of the sets of internal components 800 a,b includes one or more processors 820, one or more computer-readable RAMs 822 and one or more computer-readable ROMs 824 on one or more buses 826, and one or more operating systems 828 and one or more computer-readable tangible storage devices 830. The one or more operating systems 828 and rules program 114 on user computing device 110 are stored on one or more of the respective computer-readable tangible storage devices 830 for execution by one or more of the respective processors 820 via one or more of the respective RAMs 822 (which typically include cache memory). In the embodiment illustrated in FIG. 6, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that can store a computer program and digital information.

Each set of internal components 800 a,b also includes a R/W drive or interface 832 to read from and write to one or more portable computer-readable tangible storage devices 936 such as a CD-ROM, DVD, memory stick, magnetic tape, magnetic disk, optical disk or semiconductor storage device. Rules program 114 on user computing device 110 can be stored on one or more of the respective portable computer-readable tangible storage devices 936, read via the respective R/W drive or interface 832 and loaded into the respective hard drive 830.

Each set of internal components 800 a,b can also include network adapters or interfaces 836 such as TCP/IP adapter cards, wireless wi-fi interface cards, 3G or 4G wireless interface cards or other wired or wireless communication links. Rules program 114 can be downloaded to respective user computing device 110 from an external computer or external storage device via a network (for example, the Internet, a local area network or other, wide area network) and respective network adapters or interfaces 836. From the network adapters or interfaces 836, rules program 114 is loaded into the respective hard drive 830. The network may comprise copper wires, optical fibers, wireless transmission, routers, firewalls, switches, gateway computers and/or edge servers.

Each of the sets of external components 900 a,b can include a computer display monitor 920, a keyboard 930, and a computer mouse 934. External components 900 can also include touch screens, virtual keyboards, touch pads, pointing devices, and other human interface devices. Each of the sets of internal components 800 a,b also includes device drivers 840 to interface to computer display monitor 920, keyboard 930 and computer mouse 934. The device drivers 840, R/W drive or interface 832 and network adapter or interface 836 comprise hardware and software (stored in storage device 830 and/or ROM 824).

Aspects of the present invention have been described with respect to block diagrams and/or flowchart illustrations of methods, apparatus (system), and computer program products according to embodiments of the present invention. It will be understood that each block of the flowchart illustrations and/or block diagrams, and combinations of blocks in the flowchart illustrations and/or block diagrams, can be implemented by computer instructions. These computer instructions can be provided to a processor of a general purpose computer, special purpose computer, or other programmable data processing apparatus, such that instructions, which execute via the processor of the computer or other programmable data processing apparatus, create means for implementing the functions/acts specified in the flowchart and/or block diagram block or blocks.

The aforementioned programs can be written in any combination of one or more programming languages including low-level, high-level, object-oriented or non object-oriented languages, such as Java®, Smalltalk, C, and C++. The program code can execute entirely on the user's computer, partly on the user's computer, as a stand-alone software package, partly on the user's computer and partly on a server computer, or entirely on a server computer. In the latter scenario, the server computer can be connected to the user's computer through any type of network, including a local area network (LAN) or a wide area network (WAN), or the connection may be made to an external computer (for example, through the Internet using an Internet service provider). Alternatively, the functions of the aforementioned programs can be implemented in whole or in part by computer circuits and other hardware (not shown).

Based on the foregoing, computer system, method and program product have been disclosed in accordance with the present invention. However, numerous modifications and substitutions can be made without deviating from the scope of the present invention. Such modifications and substitutions that may be apparent to a person skilled in the art of the invention are intended to be included within the scope of the invention as defined by the accompanying claims. In this regard, each block in the flowcharts or block diagrams may represent a module, segment, or portion of code, which comprises one or more executable instructions for implementing the specified logical function(s). The foregoing description is not intended to be exhaustive or to limit the invention to the precise form disclosed. Therefore, the present invention has been disclosed by way of example and not limitation.

What is claimed is:

1. A method comprising the steps of:
reading, by one or more computer processors, a user-created rule;
requesting, by one or more computer processors, from another computer, a current version of a web page named in the user-created rule;
searching, by one or more computer processors, the current version of the web page, without displaying the web page, for a specific content defined in the user-created rule;
determining, by one or more computer processors, if the specific content meets a target condition defined in the user-created rule;
determining, by one or more computer processors, whether the user-created rule includes text; and
responsive to determining the target condition is met, performing, by one or more computer processors, an operation as defined in the user-created rule, wherein the operation notifies a user that the target condition has been met, and wherein the operation includes at least one of opening, by one or more computer processors, a desktop application, and displaying, by one or more computer processors, the current version of the web page, and responsive to determining the user-created rule includes text, including the text in the operation as defined in the user-created rule.

2. The method of claim 1, wherein the specific content defined in the user-created rule is at least one of a word, a number, a percentage and a phrase to be searched for on a web page, as defined in the user-created rule.

3. The method of claim 1, wherein the target condition defined in the user-created rule is at least one of a threshold value, a range of values, a keyword, and a notification of the specific content defined in the user-created rule.

4. The method of claim 1, wherein the operation further includes at least one of sending, by one or more computer processors, an electronic message to an address identified in the user-created rule, sending, by one or more computer processors, an SMS message, and displaying, by one or more computer processors, a second web page.

5. The method of claim 1, wherein reading a user-created rule further comprises:
determining, by one or more computer processors, based, at least in part, on the user-created rule, a timing schedule for performance of the user-created rule.

6. The method of claim 1, wherein the user-created rule is created using a user interface, wherein the user interface provides the user with a plurality of tabs for managing the user-created rule.

7. The method of claim 6, wherein the plurality of tabs include at least a tab to create a rule, a tab to edit a rule, and a tab to remove a rule.

8. A computer program product comprising:
one or more computer-readable tangible storage devices and program instructions stored on at least one of the one or more computer-readable tangible storage devices, the program instructions comprising:
program instructions to read a user-created rule on a computer;
program instructions to request, from another computer, a current version of a web page named in the user-created rule;
program instructions to search the current version of the web page, without displaying the web page, for specific content defined in the user-created rule;
program instructions to determine if the specific content meets a target condition defined in the user-created rule;
program instructions to determine whether the user-created rule includes text; and
responsive to determining the target condition is met, program instructions to perform an operation as defined in the user-created rule, wherein the operation notifies a user of the computer that the target condition has been met, and wherein the operation includes at least one of program instructions to open a desktop application on the computer, and program instructions to display the current version of the web page, and responsive to determining the user-created rule includes text, program instructions to include the text in the operation as defined in the user-created rule.

9. The computer program product of claim 8, wherein the specific content defined in the user-created rule is at least one of a word, a number, a percentage and a phrase to be searched for on a web page, as defined in the user-created rule.

10. The computer program product of claim 8, wherein the target condition defined in the user-created rule is at least one of a threshold value, a range of values, a keyword, and a notification of the specific content defined in the user-created rule.

11. The computer program product of claim 8, wherein the program instructions to perform the operation further include at least one of program instructions to send an electronic message to an address identified in the user-created rule, program instructions to send an SMS message, and program instructions to display a second web page.

12. The computer program product of claim 8, wherein the program instructions to read a user-created rule on the computer further comprise:
program instructions to determine, based, at least in part, on the user-created rule, a timing schedule for performance of the user-created rule.

13. The computer program product of claim 8, wherein the user-created rule is created using a user interface, wherein the user interface provides the user with a plurality of tabs for managing the user-created rule.

14. A computer system comprising:
one or more processors, one or more computer-readable memories, one or more computer-readable tangible storage devices, and program instructions stored on at least one of the one or more computer-readable tangible storage devices for execution by at least one of the one or more processors via at least one of the one or more computer-readable memories, the program instructions comprising:
program instructions to read a user-created rule on a computer;
program instructions to request, from another computer, a current version of a web page named in the user-created rule;

program instructions to search the current version of the web page, without displaying the web page, for specific content defined in the user-created rule;
program instructions to determine if the specific content meets a target condition defined in the user-created rule; and
responsive to determining the target condition is met, program instructions to perform an operation as defined in the user-created rule, wherein the operation notifies a user of the computer that the target condition has been met, and wherein the operation includes at least one of program instructions to open a desktop application on the computer and program instructions to display the current version of the web page, and responsive to determining the user-created rule includes text, program instructions to include the text in the operation as defined in the user-created rule.

15. The computer system of claim 14, wherein the specific content defined in the user-created rule is at least one of a word, a number, a percentage and a phrase to be searched for on a web page, as defined in the user-created rule.

16. The computer system of claim 14, wherein the target condition defined in the user-created rule is at least one of a threshold value, a range of values, a keyword, and a notification of the specific content defined in the user-created rule.

17. The computer system of claim 14, wherein the program instructions to perform the operation include at least one of program instructions to send an electronic message to an address identified in the user-created rule, program instructions to send an SMS message, and program instructions to display a second web page.

18. The computer system of claim 14, wherein the program instructions to read a user-created rule on the computer further comprise:
program instructions to determine, based, at least in part, on the user-created rule, a timing schedule for performance of the user-created rule.

19. The computer system of claim 14, wherein the user-created rule is created using a user interface, wherein the user interface provides the user with a plurality of tabs for managing the user-created rule.

* * * * *